Oct. 13, 1953  B. RICHTER  2,655,154
VALVULOTOME
Original Filed Nov. 30, 1951
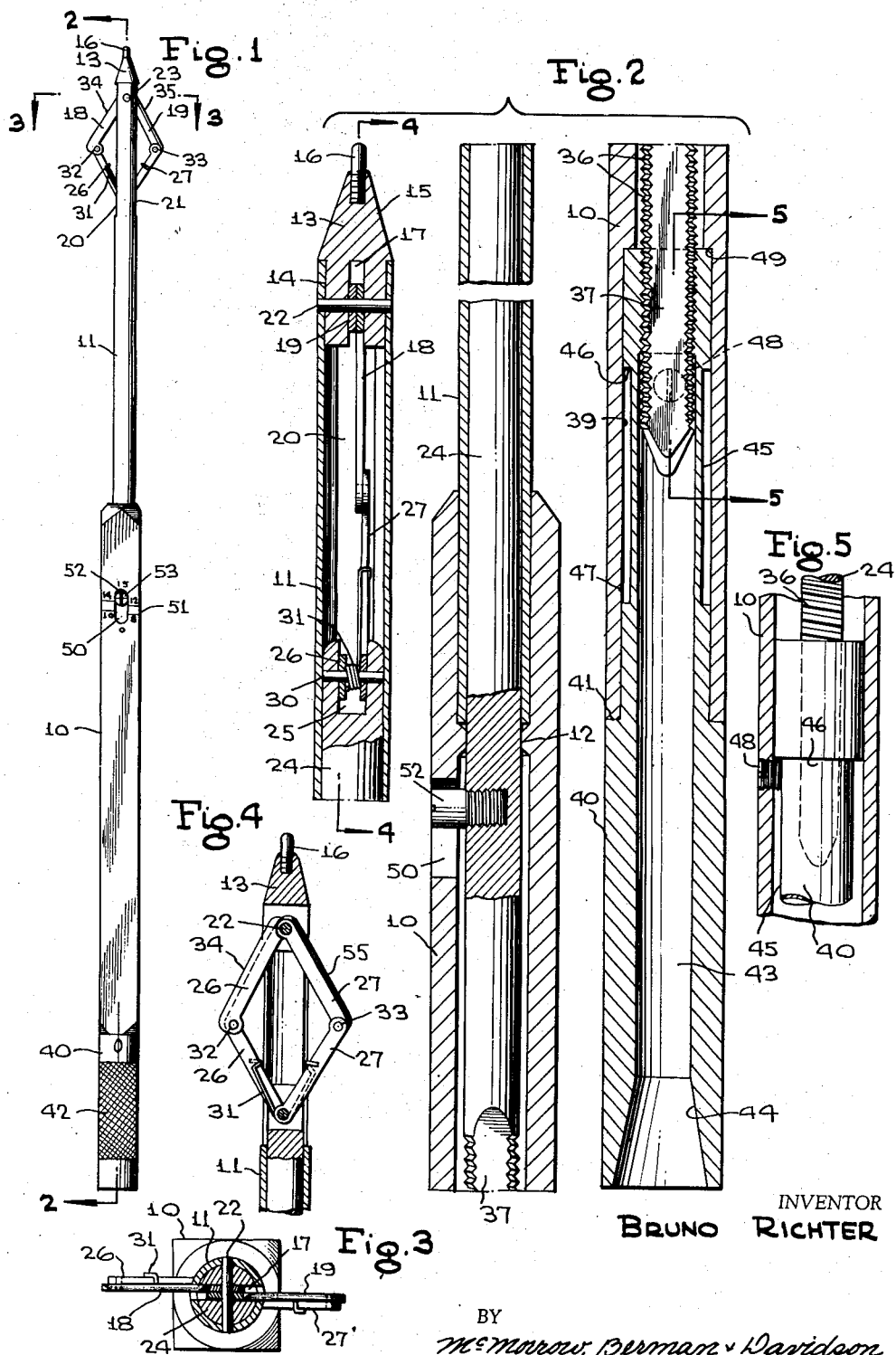
INVENTOR
BRUNO RICHTER
BY
McMorrow, Berman & Davidson
ATTORNEYS Patented Oct. 13, 1953

2,655,154

UNITED STATES PATENT OFFICE 2,655,154

VALVULOTOME

Bruno Richter, Glen Ellyn, Ill.

Continuation of application Serial No. 259,190, November 30, 1951. This application December 5, 1952, Serial No. 324,200

4 Claims. (Cl. 128—305)

This invention relates to surgical instruments, and more particularly to a valvulotome for operating on the pulmonary valve.

It is among the objects of the invention to provide an improved valvulotome which is expansible and collapsible and can be inserted to operative position in collapsed condition and then expanded to make an incision of the desired depth; which has a stem and cutting blades disposed at respectively opposite sides of the stem and convergently inclined relative to each other; which has the cutting blades disposed near one end of the stem and manually adjustable means at the other end of the stem for expanding and collapsing the blades; which has means accurately indicating the extent of expansion of the blades, so that an incision of predetermined depth can be made; which has the end of the stem remote from the blades conditioned to receive a standard syringe for pre-operative and post-operative cleaning purpose; and which is simple and durable in construction and positive and effective in use.

Other objects and advantages will become apparent from a consideration of the following description and the appended claims in conjunction with the accompanying drawing, wherein:

Figure 1 is a side elevational view of a valvulotome illustrative of the invention;

Figure 2 is a cross-sectional view on an enlarged scale taken on the line 2—2 of Figure 1;

Figure 3 is a transverse cross-sectional view on an enlarged scale taken on the line 3—3 of Figure 1;

Figure 4 is a fragmentary cross-sectional view on the line 4—4 of Figure 2; and

Figure 5 is a fragmentary cross-sectional view on the line 5—5 of Figure 2.

With continued reference to the drawing, the valvulotome comprises an enlongated handle or shank 10 of square cross-sectional shape having a bore of circular cross-sectional shape extending coaxially therethrough from one end to the other, and the numeral 11 designates a tubular stem of circular cross-sectional shape extending longitudinally from one end of the shank 10. The stem 11 is telescopically received at one end in the corresponding end of the shank and rigidly and permanently secured in the shank by suitable means, such as being sweated or soldered, into the shank. The bores of the stem and the shank are in longitudinal alignment, but the bore of the shank is substantially equal in diameter to the outside diameter of the stem, and the shank is provided adjacent its end from which the stem extends with an internal annular rib or bead 12 which abuts the inner end of the stem and limits movement of the stem inwardly of the shank when the two parts are assembled together. The shank and stem together constitute an elongated tubular casing of the instrument.

A cap 13 has a cylindrical portion 14 received in the end of the stem 11 remote from the shank 10 and terminating in an annular shoulder overlying the adjacent end of the stem and with an outwardly tapered, substantially conical portion 15, the distal end of which is provided with a tapped hole or recess receiving a screw-threaded pin 16 which has a rounded outer end and constitutes the point of the instrument. The cylindrical portion 14 of the cap is provided with a diametrically extending slot 17 opening to the end of the cap within the stem 11 and a pair of elongated blades 18 and 19 have each one end disposed in the slot 17 in the cap 13. The stem 11 is provided at the end thereof receiving the cap 13 with diametrically opposed, longitudinally extending slots 20 and 21 through which the blades are movable, these slots being longer than the blades for a purpose to be presently explained.

A pivot pin 22 extends through the stem 11 and the cap 13 transversely of the slot 17 and through the end portions of the blades 18 and 19 received in the slot 17 and secures the cap in the adjacent end of the stem and also pivotally connects the blades to the cap.

A shaft 24 of circular cross-sectional shape extends through the bores of the shank 10 and stem 11, but terminates short of the distal end of the shank, as is clearly illustrated in Figure 2. This shaft has in one end a diametrically extending transverse notch 25, and a pair of arms 26 and 27 are received each at one end in the notch 25 of the shaft. A pivot pin 30 extends through the notched end of the shaft 24 transversely of the notch 25 and through the ends of the arms 26 and 27 received in the notch 25 pivotally connecting the arms to the shaft, and a loop spring 31 has its loop surrounding the pin 30 between the adjacent ends of the arms 26 and 27 and its ends respectively engaging these arms to resiliently urge the arms outwardly through the slots 20 and 21 in the stem 11.

At its end remote from the shaft 24 the arm 26 is pivotally connected to the end of blade 18 remote from cap 13 by a pivot pin 32 extending through the arm and the blade and at its end remote from the shaft 24 the arm 27 is pivotally connected to the blade 19 at the end of this blade remote from the cap 13 by a pivot pin 33.

The blades 18 and 19 and the respectively associated arms 26 and 27 constitute toggle link structures between the relatively fixed cap 13 and the adjacent end of the movable shaft 24, so that the blades will be swung inwardly or outwardly relative to the stem 11 upon movement of the shaft 24 longitudinally of the stem in the corresponding direction. The blades are provided on their edges remote from each other with cutting edges, as indicated at 34 and 35, and the blades are normally convergently inclined in a direction from the arms 26 and 27 to the pivot pin 22, which pivotally connects the blades to the cap 13.

The spring 31 resiliently urging the arms 26 and 27 outwardly relative to the stem 11 overcomes any tendency of the toggle link structures comprising the blades and the arms becoming locked in dead center position when the blades and arms are retracted to their limiting positions inwardly of the stem.

The end portion of the shaft 24 received within the shank or handle 10 is externally screw-threaded, as indicated at 36, and is flattened on opposite sides of its screw-threaded portion, as indicated at 37 in Figure 2.

At its end remote from the stem 11 the shank 10 is provided with a counterbore 39 which is coaxial with the bore of the shank, but has a diameter slightly greater than the diameter of the remainder of the bore of the shank, and an elongated, tubular nut 40 has one end portion reduced in diameter to closely fit into the counterbore 39 of the shank 10. The other end portion of the nut 40 has an outside diameter substantially equal to the thickness of the shank 10 and terminates in an annular shoulder 41 overlying the end of the shank 10 remote from the stem 11.

The portion of the nut 40 extending outwardly of the shank 10 is externally roughened or knurled, as indicated at 42, and this nut is provided with a bore 43, the end of which remote from the shank 10 is outwardly beveled or flared, as indicated at 44, to receive the orifice end of a conventional syringe.

The portion of the nut within the shank 10 is annularly recessed externally, as indicated at 45, providing an elongated external groove terminated by shoulders 46 and 47 at its opposite ends. The shank 10 is provided in the portion thereof receiving the reduced end portion of the nut 40 with a tapped hole and a set screw 48 is threaded through this tapped hole and engages the shoulder 46 on the nut remote from the annular shoulder 41 to hold the nut against longitudinal movement in the shank while permitting free rotational movement of the nut, the nut being held against longitudinal movement in one direction by the screw 48 and in the other direction by the contact of the annular shoulder 41 with the adjacent end of the shank 10, and by engagement of the inner end of the nut with an annular internal shoulder 49 at the inner end of the counterbore 39 in the shank.

At its inner end the nut is internally screw-threaded and threaded onto the externally screw-threaded portion 36 of the shaft 24, so that rotational movement of the nut relative to the shank 10 will cause the shaft 24 to move longitudinally relative to the shank and the stem 11. Thus, by rotating the nut 40 in the appropriate direction, the blades 18 and 19 can be caused to expand outwardly of or retract inwardly of the slotted end portion of the stem 11.

Intermediate its length the shank 10 is provided with a longitudinally extending slot 50 and with graduating marks 51 spaced apart longitudinally of this slot, and a screw 52 is threaded into a tapped hole in the shaft 24 and extends into the slot 50. This screw 52 has a graduating mark 53 extending diametrically thereacross, which mark cooperates with the graduated marks 51 on the shank to accurately indicate the extent to which the blades are expanded outwardly of the stem 11.

Thus, with this arrangement, the instrument may be forced in contracted condition through a wall of a heart, and then expanded to make an incision of predetermined depth through a stenotic valve. After the incision has been made, the instrument may be again fully contracted and removed without causing damage to the tissues through which it passes, and without causing extensive hemorrhage.

The entire instrument is preferably formed of a heat and corrosion-resisting material, such as stainless steel, so that it can be thoroughly sterilized before use and will not rust or corrode while in storage, and is carefully manufactured so that it is freely adjustable at all times without binding or distortion of its parts.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

This application is a continuation of application Serial No. 259,190, filed November 30, 1951, now abandoned.

What is claimed is:

1. A valvulotome comprising an elongated tubular shank of non-circular cross-sectional shape, an elongated tubular stem projecting longitudinally from one end of said shank with its bore in alignment with the bore of said shank and having longitudinally extending slots diametrically opposed at its end remote from said shank, an outwardly tapered cap secured to said stem in closing relationship to the distal end thereof, elongated blades pivotally connected each at one end to said cap and movable one through each of said slots, a shaft extending through said shank and said stem and having one end adjacent said slots and an externally screw-threaded portion disposed within said shank, arms pivotally connected each at one end to said shaft at said one end of the latter and pivotally connected at their other ends respectively to said blades at the other ends of the latter, said blades and the associated arms constituting toggle link assemblies connected between said cap and said shaft effective to swing said blades inwardly and outwardly relative to said stem upon longitudinal movement of said shaft in respectively opposite directions relative to said stem, a tubular nut threaded onto the screw-threaded portion of said shaft and having one portion thereof rotatably received in said shank and another portion thereof projecting from the end of said shank remote from said stem and externally roughened, means carried by said shank and engaging said nut holding the latter against longitudinal movement relative to said shank and enabling said nut to impart longitudinal movement to said shaft upon rotation of said nut relative to said shank, said shank having a longitudinally extending closed slot therein, means carried by said shaft and extending into the slot in said shank to indicate the extent of movement of said blades outwardly of said stem, and a spring engaging said arms and resiliently urging said arms and said blades outwardly of said stem.

2. A valvulotome comprising an elongated tubular casing having diametrically opposite longitudinally extending slots in one end thereof, a cap secured to said casing in closing relationship to said one end thereof, a shaft extending longitudinally of the interior of said casing and having one end adjacent said cap and its other end adjacent the other end of said casing, said shaft having an externally screw-threaded portion at said other end thereof, a tubular nut having a portion rotatably secured in the other end of said casing and threaded onto the screw-threaded portion of said shaft and another portion extending longitudinally from said other end of the casing, means carried by said casing restraining said nut against longitudinal movements relative to the casing, elongated blades pivotally connected each at one end to said cap and extending one through each of the slots in said casing, and means extending through said slots connecting said shaft at said one end thereof to the other ends of said blades and effective to move said other ends of said blades toward or away from said casing upon longitudinal movements of said shaft in corresponding directions relative to said casing.

3. A valvulotome comprising an elongated tubular casing having at one end longitudinally extending slots angularly spaced therearound, a cap closing said one end of the casing, elongated blades connected each at one end to said cap within said casing and extending one through each of said slots, a shaft extending longitudinally of the bore of said casing and having one end adjacent said cap and its other end adjacent the other end of said casing, said shaft having an externally screw-threaded portion at said other end thereof, means connecting said one end of said shaft to the other ends of said blades and moving said other ends of the blades toward and away from said casing upon longitudinal movements of said shaft in the corresponding direction relative to said casing, and means engaging said casing at said other end thereof and threaded onto the screw-threaded portion of said shaft imparting longitudinal movements to said shaft upon rotational movements of the last-mentioned means relative to said casing.

4. A valvulotome comprising a casing, opposed cutting blades positioned adjacent one end of said casing and pivotally connected together at one end for movement toward and away from each other, a shaft extending longitudinally of and connected to said casing for reciprocatory movement, opposed arms pivotally connected together at one end to said shaft, the other end of each arm being pivotally connected to the other end of the corresponding blade, spring means operatively connected to said arms for urging said blades away from each other, and hand actuable means operatively connected to said shaft for effecting the reciprocatory movement of the latter to thereby cause the blades to move toward and away from each other.

BRUNO RICHTER.

References Cited in the file of this patent

UNITED STATES PATENTS

| Number | Name | Date |
|---|---|---|
| 68,647 | Palmer | Sept. 10, 1867 |

FOREIGN PATENTS

| Number | Country | Date |
|---|---|---|
| 5,318 | Great Britain | of 1897 |
| 214,172 | Germany | Oct. 9, 1909 |